US007991043B2

United States Patent
Gorday (10) Patent No.: US 7,991,043 B2
(45) Date of Patent: Aug. 2, 2011

(54) HYBRID POLYPHASE AND JOINT TIME-FREQUENCY DETECTION

(75) Inventor: Robert Mark Gorday, Wellington, FL (US)

(73) Assignee: Freescale Semiconductor, Inc., Austin, TX (US)

( * ) Notice: Subject to any disclaimer, the term of this patent is extended or adjusted under 35 U.S.C. 154(b) by 565 days.

(21) Appl. No.: 12/140,597

(22) Filed: Jun. 17, 2008

(65) Prior Publication Data

US 2009/0310653 A1 Dec. 17, 2009

(51) Int. Cl.
*H04B 1/10* (2006.01)
*H04L 27/22* (2006.01)

(52) U.S. Cl. .......................... 375/150; 375/340; 375/343

(58) Field of Classification Search .................. 375/140, 375/142–143, 145, 147, 149, 150, 316, 324–326, 375/340, 343, 355, 359, 362, 365–366, 329, 375/347; 370/324, 350, 514; 340/3.21; 329/347, 329/358, 304, 305, 306
See application file for complete search history.

(56) References Cited

U.S. PATENT DOCUMENTS

| | | | | |
|---|---|---|---|---|
| 3,679,109 A | * | 7/1972 | King, Jr. ............................ 225/2 |
| 7,221,665 B1 | * | 5/2007 | Mower et al. .................. 370/335 |
| 7,236,554 B2 | * | 6/2007 | Gupta ............................ 375/355 |
| 7,684,473 B2 | * | 3/2010 | Walton et al. .................. 375/150 |
| 7,826,493 B2 | * | 11/2010 | Chang et al. ................... 370/514 |
| 7,899,139 B2 | * | 3/2011 | Nakahara et al. .............. 375/342 |
| 2007/0104297 A1 | * | 5/2007 | Gorday .......................... 375/343 |
| 2008/0240166 A1 | * | 10/2008 | Gorday et al. ................ 370/514 |
| 2009/0041167 A1 | * | 2/2009 | Kadota et al. .................. 375/343 |

OTHER PUBLICATIONS

U.S. Appl. No. 11/578,422, filed Feb. 23, 2007, Gorday et al.

* cited by examiner

*Primary Examiner* — Tesfaldet Bocure
*Assistant Examiner* — Lawrence B Williams (57) ABSTRACT

A demodulator in a receiver includes a correlator (240) for de-spreading a spread-spectrum signal, and a decision module (250) for detecting a preamble and for synchronizing to data frames of the spread spectrum signal. The demodulator includes symbol timers (231 and 233) that allow the demodulator to correlate to two preamble symbols simultaneously, where the two preamble symbols occur one-half a symbol period apart. The correlator includes a correlator structure having taps that correct for any frequency offset of a carrier signal. The correlator correlates to each of the two preamble symbols a plurality of times through oversampling, where each correlation compensates for a different amount of frequency offset. By analyzing occurrence of peaks in magnitude of the correlations, the decision module detects the preamble and selects weights for the taps to de-spread data frames received after the preamble.

20 Claims, 9 Drawing Sheets

HYBRID POLYPHASE AND JOINT TIME-FREQUENCY DETECTION

BACKGROUND OF THE INVENTION

1. Field of the Invention

This invention relates generally to radio frequency receivers, and more specifically to detecting a preamble of a spread spectrum radio signal.

2. Related Art

A demodulator for the 802.15.4 wireless personal area network (PAN) protocol promulgated by the Institute of Electrical and Electronics Engineers (IEEE) synchronizes to each packet by first detecting a preamble, then searching for a start of frame delimiter (SFD) that follows the preamble. Detection and synchronization algorithms are designed to provide a high probability of correct synchronization, balanced with a low probability of false detection and synchronization. Preamble detection logic searches the output of a correlator for a pattern, or signature, that indicates that analog-to-digital (A/D) samples outputted by a receiver include a preamble signal notwithstanding that the preamble signal may be noisy. When the samples consist only of noise, the correlator produces output peaks with random amplitude. The preamble detection logic is designed to reject such noise-only conditions with high reliability. Classic detection algorithms use a correlator output threshold, above which the preamble detection logic determines that a signal, with noise, is present. Below the threshold, the preamble detection logic determines that only noise is present, or that a signal, too weak to receive in subsequent demodulation, is present. The performance of known amplitude threshold algorithms have shown that optimizing the threshold for false detection has an inverse effect on detection performance. Because of the strong inverse relationship, the threshold is a very sensitive parameter that is also affected by radio gain variations (e.g., automatic gain control algorithms), noise figure variations, and the presence of interference.

The 802.15.4 protocol with a 2.4 GHz physical layer (PHY) of the Open Systems Interconnection Basic Reference Model specifies 32-chip spreading codes.

One known product designed for the 802.15.4 protocol with a 2.4 GHz PHY and 32-chip spreading codes performs a correlation to a single code, or symbol, without any frequency offsets, and its preamble detection algorithm achieves an average false detection interval of 7 sec in a continuous search mode. Although 7 sec is a relatively long interval compared to a maximum packet length of 4.3 msec, a 7 sec average false detection interval is nevertheless undesirable and it may cause a reduction in battery life in some applications.

Another known product designed for the 802.15.4 protocol with the 2.4 GHz PHY and 32-chip spreading codes, has two preamble detection algorithms to improve false detection performance, i.e., to increase the average false detection interval. This known product provides about a one hundred times increase in the average false detection interval compared to the first mentioned product, while maintaining a high detection/synchronization performance. One of these two algorithms, which does not require an automatic frequency control (AFC), is a "polyphase" detection algorithm, meaning that it correlates to more than one phase, or code. The other of these two algorithms, which does require AFC, is a "joint time-frequency" detection algorithm that includes a bank of correlators, each correlator having a different frequency offset.

The polyphase algorithm correlates to two (or more) codes simultaneously to provide additional un-correlated detection metrics. Because the 32-chip codes of the 802.15.4 protocol are related by a circular shift, correlation to alternate codes during the eight-code preamble produces alternate signal peaks that occur at 4*n chip intervals (n=0, 1, ..., 7). The polyphase algorithm includes a two-code detection implementation using n=0 (symbol "0") and n=4 (symbol "4"). With the polyphase algorithm, the eight-code preamble produces a theoretical maximum of fifteen (15) strong peaks, instead of a theoretical maximum of eight (8) strong peaks that the preamble would produce for a single-code correlation. By using almost two times as many peaks, which are un-correlated when only noise is present, false detections are approximately two orders of magnitude less likely to occur compared to using the polyphase algorithm. The polyphase algorithm is used only for a differential chip detection (DCD) mode of the demodulator.

The joint time-frequency algorithm provides an improved sensitivity and a better delay spread tolerance compared to the polyphase algorithm, and the joint time-frequency algorithm improves communications range by approximately two times. The joint time-frequency algorithm simultaneously detects the preamble and estimates the frequency offset, so that the resulting frequency correction can be applied during payload detection. The frequency offset is detected by repeating each correlation at eleven (11) different frequency offsets, where the frequency separation between frequency offsets is selected as $\Delta f$ to allow no more than 2 dB degradation in the correlator versus frequency response. The detection rules then require a sequence of four (4) correlation peaks (one per symbol) on up to two adjacent frequencies. For a set of correlations with frequency separation $\Delta f$, noise out of the correlator is random and un-correlated. By using a set of eleven (11) correlations, each at a different frequency offset, it is less likely for noise to produce a sequence of four correlator peaks at the same or adjacent frequencies, compared to using one correlation. The joint time-frequency algorithm is used only for a non-coherent chip detection (NCD) mode of the demodulator, which means correlation of a received chip sequence having random phase rotations, with known chip sequences, after which a symbol decision is made based upon the correlation that produced a largest correlation magnitude.

The 802.15.4b protocol includes a 900 MHz/250 Kbps PHY that is substantially similar to the 2.4 GHz/250 Kbps PHY, with the exception that the length of the spreading codes is cut in half. The 900 MHz PHY of the 802.15.4b protocol specifies 16-chip spreading codes. The 900 MHz PHY uses 16-chip spreading codes instead of the 32-chip spreading codes used for the 2.4 GHz PHY because the bandwidth of 900 MHz channels is smaller than the bandwidth of 2.4 GHz channels. Therefore, to maintain, at 900 MHz, the same data rate as the data rate at 2.4 GHz, the number of chips per symbol is reduced. The shortened length of the spreading codes detrimentally impacts detection and synchronization performance. Also, for the 900 MHz PHY, the average false detection interval disadvantageously decreases because of decreased decorrelation in the frequency domain.

Because of the shortened length of the spreading codes, the preamble detection algorithms of the known products do not produce acceptable performance. The known algorithms were designed for the 2.4 GHz PHY and 32-chip spreading codes, and, when used with the 900 MHz PHY and 16-chip spreading codes, the false detection performance degrades. Using the preamble detection algorithms of the known products to detect a preamble comprising 16-chip codes would result in an approximately ten times degradation in the average false detection interval compared to using the same algorithms to detect a preamble comprising 32-chip codes. Such degradation would reduce performance to a level well below most system requirements.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION OF THE EXEMPLARY EMBODIMENT

Figure 1:
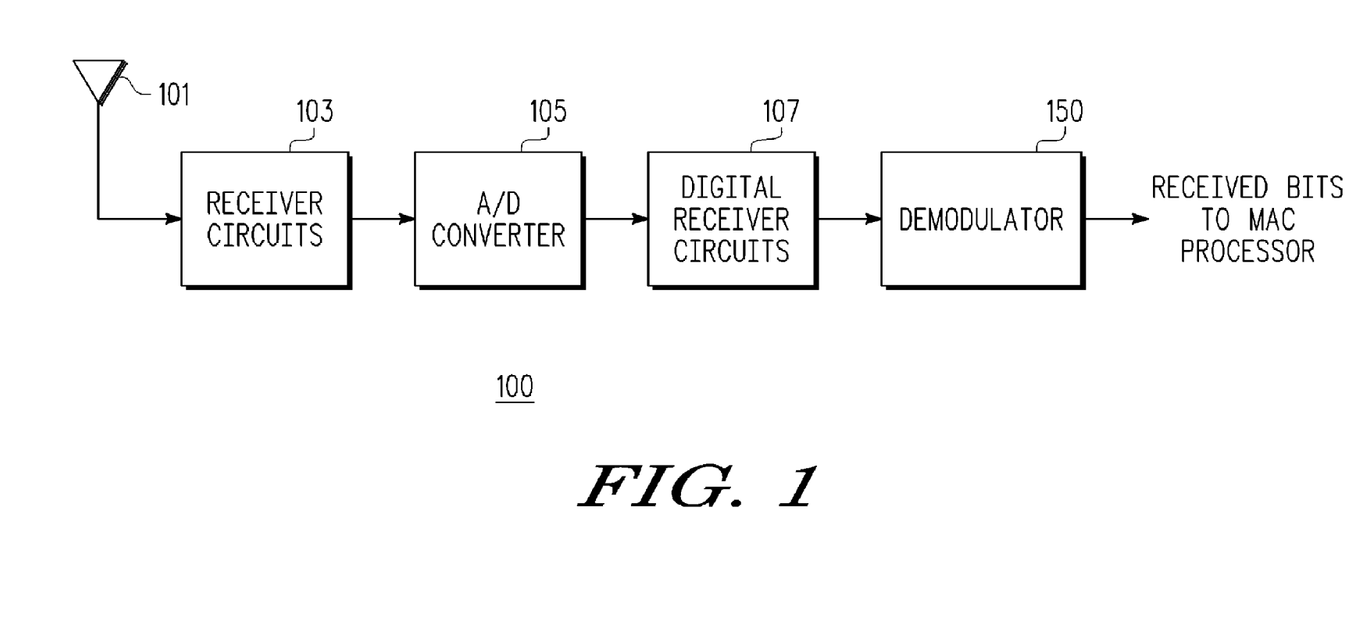
FIG. 1 is a simplified functional block diagram of a portion of an exemplary receiver including a demodulator.

FIG. 1 is a simplified functional block diagram of a portion of an exemplary receiver 100. The receiver 100 includes an antenna 101 for receiving a digitally-modulated signal, including, in particular, any coded-modulation signal such as a direct sequence spread spectrum (DSSS) signal. The receiver 100 further includes analog receiver circuits 103, an A/D converter 105, digital receiver circuits 107 and a demodulator 150. In an exemplary embodiment, the receiver 100 down-converts a 900 MHz band RF received signal. The demodulator 150 performs symbol decisions to recover originally transmitted information in the received signal. The demodulator 150 uses non-coherent detection to de-spread a received DSSS signal, such as an offset quadrature phase-shift keying (OQPSK) DSSS signal or a binary phase shift-keying (BPSK) DSSS signal. In the exemplary embodiment, the demodulator 150 demodulates received data that was modulated according to the IEEE 802.15.4b protocol with a 900 MHz band PHY. The demodulator 150 outputs received bits to a media access control (MAC) processor (not shown). The demodulator 150 uses a detection method that is a hybrid of a polyphase detection method and a joint time-frequency detection method.

Figure 2:
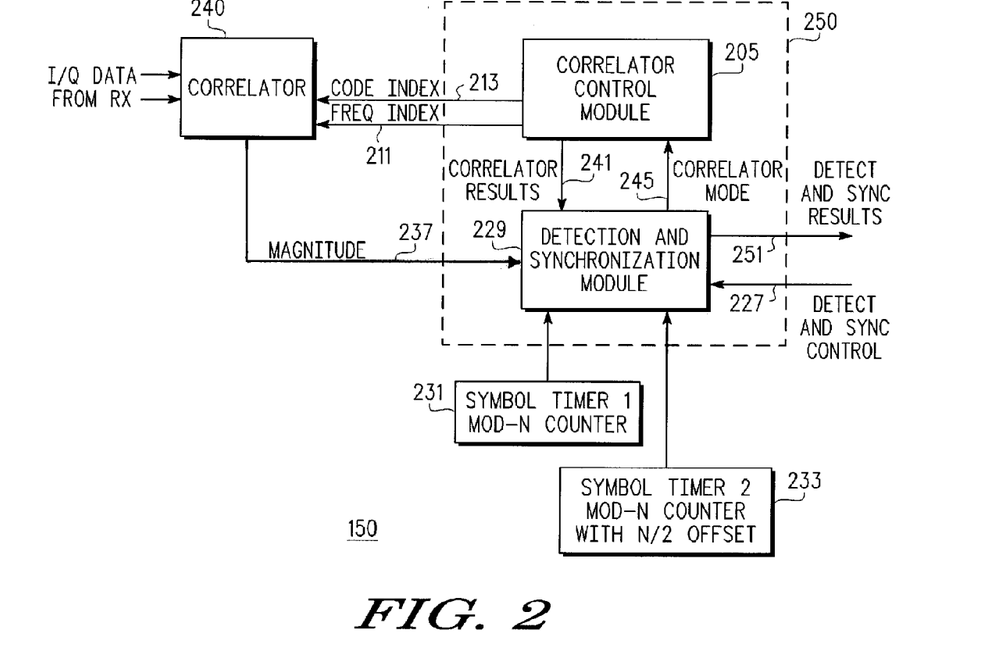
FIG. 2 is a simplified functional block diagram of the demodulator of FIG. 1, including a correlator, a correlator control module, detection and synchronization module, and counters.

FIG. 2 is a simplified functional block diagram of the demodulator 150. The demodulator 150 comprises a correlator 240, a correlator control module 205, a detection and synchronization module 229, and symbol timers such as counter_, 231, and counter_2, 233. Counter_, 231, is a modulo-N counter that cyclically counts from 0 to N−1, and then repeats the 0 to N−1 count. Counter_2, 233, is also a modulo-N counter whose count is offset from counter_, 231, by N/2 counts. In an exemplary embodiment, N=32 because each symbol of the 802.15.4b protocol comprises 16-chips and the correlator 240 oversamples each chip by two, i.e., an oversampling ratio S is two (2). The correlator 240 receives in-phase (I-phase) and quadrature-phase (Q-phase) data from the digital receiver circuits 107. The correlator 240 receives a frequency_index 211 and a code_index 213 from the correlator control module 205. The correlator control module 205 controls the operation of the correlator 240. The correlator 240 outputs a correlator results magnitude 237 to the detection and synchronization module 229. The correlator control module 205 outputs correlator results 241 to the detection and synchronization module 229.

The detection and synchronization module 229 processes the correlator results 241 to detect the preamble and the SFD, and to simultaneously acquire time and frequency synchronization data. An input signal to the detection and synchronization module 229 is a detect and synchronization control signal 227 that includes control bits that configure the demodulator 150. These control bits are static configuration bits that allow optimization of performance of the demodulator 150 for a specific use. Examples of these static configuration bits include variable configuration parameters for the hybrid preamble detection algorithm in accordance with an embodiment of the invention, such as variables P, k_last, W and threshold, which are explained more fully hereinbelow. Another example of these static configuration bits includes a programmable SFD, used to configure the demodulator 150 to perform in a standard operating mode or in a proprietary, non-standard mode. The detect and synchronization control signal 227 comes from a group of programmable memory locations that are accessible and changeable via an applications programming interface (not shown). The detection and synchronization module 229 is programmable using the applications programming interface.

The detection and synchronization module 229 outputs a detect and synchronization results 251 that comprises demodulated received bits that are sent to the MAC processor, and status registers that the MAC processor uses to help control the demodulator 150 (e.g., frequency offset, preamble detect result and SFD detection result). In an exemplary embodiment, the correlator control module 205 and the detection and synchronization module 229 are state machines. The correlator control module 205 and the detection and synchronization module 229 are part of a decision module 250. The correlator 240 is controllable to operate in various modes 245. For example, the correlator 240 operates, at times, in a preamble detection mode 701, and, at other times, in a payload detection mode 702 (see FIG. 7). Separately, the correlator 240 is programmable to operate in one of: the polyphase detection mode, the joint time-frequency detection mode, or the hybrid polyphase and joint time-frequency detection mode.

The correlator 240 is coupled to the decision module 250 and provides a respective plurality of correlations, e.g., one for each sample, to the decision module 250. The decision module 250 looks for correlation peaks that are spaced apart or separated by approximately a symbol period and provides the indication, via detect and synchronization results 251, when this situation is detected. Because the correlator 240 provides correlations that overlap, the decision module 250 is provided with inputs from counter_1, 231 and counter_2, 233 that correspond with each of the correlations. The inputs from counter_1, 231 and counter_2, 233 tell the decision module 250 when the correlator 240 has provided a symbol's worth of correlations, and, thus, when a peak should be selected from those correlations. The detect and synchronization results 251 is essentially the location of the peaks that are appropriately separated (i.e., peak index), as found by the correlations performed by the correlator 240. The peak_index and the peak_freq are used to synchronize the correlator 240 to the symbols as received, as explained more fully hereinbelow.

Figure 3:
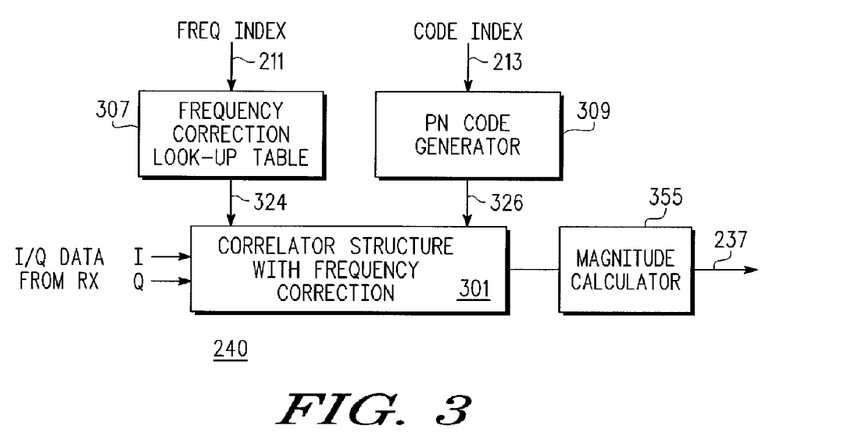
FIG. 3 is a simplified functional block diagram of the correlator of FIG. 2, including a correlator structure.

FIG. 3 is a simplified functional block diagram of the correlator 240. The correlator 240 comprises a correlator structure 301, a frequency correction look-up table 307 and a pseudorandom (PN) code generator 309. The frequency correction look-up table 307 contains coefficients of a COordinate Rotation DIgital Computer (CORDIC) operation, which is more fully explained hereinbelow. The CORDIC coefficients in the frequency correction look-up table 307 are used to generate a plurality of phase rotations. The frequency index 211 from the correlator control module 205 is fed into the frequency correction look-up table 307. The code index 213 from the correlator control module 205 is fed into the PN code generator 309. In the exemplary embodiment, the correlator control module 205 produces a sequence of 4-bit code indexes 213 that correspond to the sixteen (16) symbols, or codewords, in the 802.15.4b protocol. In the exemplary embodiment, the correlator control module 205 generates a sequence of eleven (11) frequency indexes 211. The PN code generator 309 generates a respective 16-chip PN code 326 from the code index 213. The frequency correction look-up table 307 generates a set of respective phase correction coefficients 324 from the frequency index 211. The joint time-frequency detection method comprises a step of determining a number of frequency offsets to correct. Next, coefficients are calculated based on a length of the PN codes. Then, the coefficients are converted to CORDIC coefficients. The resulting CORDIC coefficients are subsequently utilized in the correlator structure 301.

The set of phase correction coefficients 324 and the PN code 326 are used within the correlator structure 301 to operate on the received I and Q samples. The magnitude 237 outputted from the correlator structure 301 is presented back to the correlator control module 205. The correlator control module 205 then provides correlator results 241 from the magnitude 237 and from a current value of each of the frequency index 211 and the code index 213. The correlator results 241 is a maximum correlator peak, or peak magnitude 615 (see FIG. 6). For each new data sample, the correlator control module 205 identifies a maximum correlator peak from among a plurality of correlator peaks over the set of all values of k and c, as explained more fully hereinbelow. The correlator control module 205 keeps the output (magnitude 237) of the correlator structure 301 synchronized to a corresponding frequency index 211 and code index 213. During preamble detection, the correlator control module 205 performs a peak detection of the output of the correlator 240 across all frequency indexes 211 and determines a maximum correlator peak for a particular frequency index. A best, or peak, frequency index 211 is selected based on the maximum correlator peaks over a span of symbols. After the preamble is detected and a best, or peak, frequency index 211 has been determined, the peak frequency index 211 is maintained constant during a remainder of the packet. During data demodulation, while the peak frequency index 211 is maintained, the correlator control module 205 then cycles through the different code indexes 213 and selects the code index corresponding to the maximum correlator output magnitude.

Figure 4:
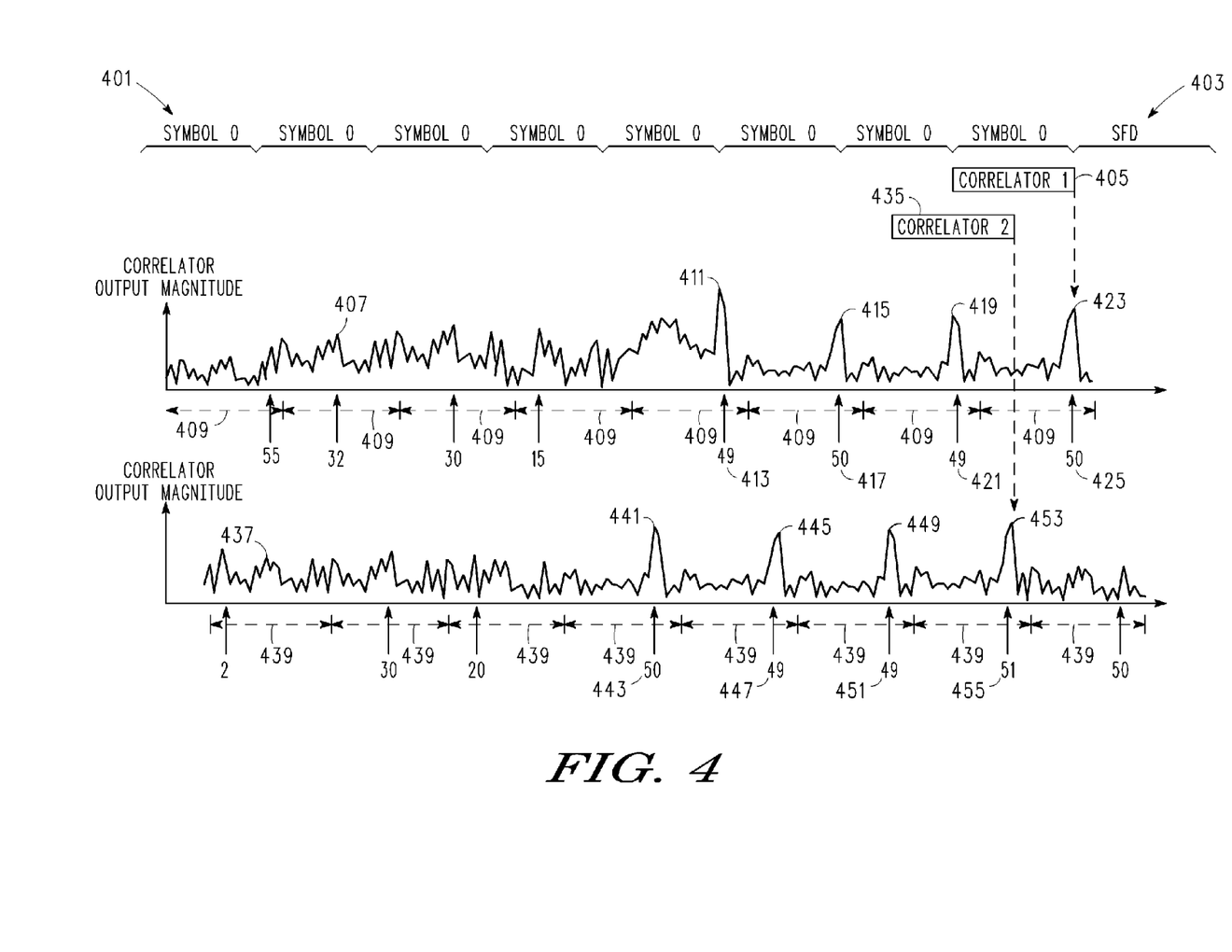
FIG. 4 is an exemplary diagram of a portion of a data frame and exemplary waveforms for the demodulator of FIG. 1 in accordance with an embodiment of the present invention.

Referring to FIG. 4 an exemplary diagram of a portion of a data frame and exemplary waveforms for the demodulator 150 in accordance with an embodiment of the invention. The exemplary diagram shows a possible preamble symbol sequence comprising a predetermined, or known, sequence of symbols 401, e.g., eight (8) symbols, each of which represents a symbol "0", followed by an SFD symbol 403. The actual symbol demarcation and symbol period (symbol time period or time duration) is represented by the demarcated line beneath the symbol "0" designations. If the predetermined sequence of symbols 401, or sufficient portion thereof, is detected, and other circumstances, e.g., the receiver 100 is looking for a data frame, are appropriate, a data frame is determined to be present. One approach to determining when the predetermined symbol sequence is present is to perform a correlation between the received data and information (e.g., a code or coefficients) representing the predetermined sequence. A first correlator (represented by a box 405), such as the correlator 240 of FIG. 2, performs sequential correlations on received data samples (not specifically shown) where the correlator is correlating a symbol duration worth of data samples with the corresponding information for the expected symbol. Visualize the correlator 240 sliding along data samples corresponding to the sequence of data samples and channel noise. Alternatively, visualize the data samples sliding through the correlator 240. The resultant exemplary magnitude 237 from the correlator 240 is shown by waveform 407, where the magnitudes for the first arriving, or earliest, data samples are at the left side of the waveform, and where the correlator magnitudes corresponding to later arriving, or latest, data samples shown at the right side of the waveform 407.

The correlator 240 does not know where a symbol of the sequence of symbols 401 actually begins, as suggested by the drawing in which each symbol period of the plurality of hypothetical symbol periods 409 begins and ends in the midst of a symbol of the sequence of symbols 401. As would be expected when the data samples corresponding to a symbol "0" are aligned with the information or coefficients representing a symbol "0", the strongest correlation and largest correlation magnitudes are observed once offset and gain mitigation has occurred. The peaks at counter index "55", "32", "30" and "15" occur prior to offset or gain corrections. Compare each peak correlator magnitude within each hypothetical symbol period 409, such as the peaks at counter indexes "55", "32", "30" and "15", with peak 411 at counter index "49" 413, peak 415 at counter index "50" 417, peak 419 at counter index "49" 421, and peak 423 at counter index "50" 425, where the counter index represent a sample by its sample number (0-63). During the period that offset and gain correction are being determined and applied, correlation magnitudes may not be as strong, and peak values within hypothetical symbol periods 409 may not be as uniformly spaced (see counter indexes "55", "32", "30" and "15"). After offset and gain correction have been determined and applied, there may be some variation, due to noise in the received signal, in the counter index at which peaks occur; however, it is evident that strong peaks are occurring at approximately a symbol period apart once any offset and gain correction has occurred (see counter indexes "49", "50", "49" and "50").

Now consider a second correlator (represented by a box 435) that "overlaps" as depicted the first correlator by a half symbol. The second correlator performs correlations between the received data and corresponding second information (codes or coefficients), where the second information includes part of the information used by the first correlator. In an exemplary embodiment, the second correlator "overlaps" the first correlator by a half symbol, and the second information comprises the later half of information corresponding to one symbol followed by the earlier half of the information corresponding to a later sequential symbol. In an exemplary embodiment, the first and second correlators comprise a single tapped delay line operating contemporaneously on the same received data samples but using different coefficients at taps to perform the correlations. In the exemplary embodiment, the first and second correlators are the same correlator 240 performing first and second correlations. Alternatively, the first and second correlators can be separate correlators.

The magnitudes of the correlations out of the second correlator are shown as the waveform 437 over a plurality of hypothetical symbol periods 439. Again note that the second correlator while synchronized to the first correlator with a fixed or known offset, e.g., a half symbol, does not know where the actual symbols begin and end as evidenced by the hypothetical symbol periods 439 beginning in the midst of respective symbols in the sequence of symbols 401. The initial correlations are not particularly strong and the early peaks may not be uniformly spaced (see counter indexes "2", "30" and "20") for the reasons discussed above. The later peaks show strong correlations and reasonably uniformly spaced peak counter indexes (peak 441 with counter index value "50" 443, peak 445 with counter index value "49" 447, peak 449 with counter index value "49" 451, and peak 453 with counter index value "51" 455). Note that the strongest correlations occur where the data samples are nearly aligned with the second information, e.g., approximately a half symbol from peaks out of the first correlator. As shown in FIG. 4, strong uniformly spaced peak correlation magnitudes occur at different times and the hypothetical symbol periods 409 and 439 vary from each other by a half symbol period. By providing additional correlations from a second correlator that are somewhat independent of the correlations from the first correlator, more accurate detections of a data frame can be made.

The polyphase detection algorithm and the demodulator 150 are more fully described in U.S. patent application publication US2007/0104297A1, entitled DETECTING A DATA FRAME, filed Nov. 4, 2005, by Gorday, et al., which is assigned to the assignee of the present invention, and which is hereby fully incorporated by reference herein.

The specifics of the first information and second information, e.g., the predetermined sequence of symbols 401 that denotes a data frame, depends on a particular air interface protocol; however, at least part of the second information (determined by the extent of the "overlap" between the correlations) is the same as the first information, albeit in different locations in the respective correlations. For example, in IEEE 802.15.4b systems, one of sixteen (16) different symbols is transmitted during each symbol period. Symbol "0" consists of a 16-chip PN code (C0, C1, . . . , C15). Symbols n=1, 2, . . . , 7 are the symbol "0" PN code circularly shifted by 2n chips. Symbols n=8, 9, . . . , 15 are conjugates (negate odd chips) of symbols n=0, 1, 2, . . . , 7. For the 802.15.4b protocol, the circularly-shifted 16-chip PN codes for each of the sixteen (16) different symbols are set forth in Table 1. For other air interface protocols, other relationships may be available.

TABLE 1

| Decimal Value | Binary Symbol | Chip Value |
|---|---|---|
| 0 | 0000 | 0 0 1 0 1 1 1 1 0 1 0 1 0 0 1 1 |
| 1 | 1000 | 1 1 0 0 1 0 1 1 1 1 0 1 0 1 0 0 |
| 2 | 0100 | 0 0 1 1 0 0 1 0 1 1 1 1 0 1 0 1 |
| 3 | 1100 | 0 1 0 0 1 1 0 0 1 0 1 1 1 1 0 1 |

TABLE 1-continued

| Decimal Value | Binary Symbol | Chip Value |
|---|---|---|
| 4 | 0010 | 0 1 0 1 0 0 1 1 0 0 1 0 1 1 1 1 |
| 5 | 1010 | 1 1 0 1 0 1 0 0 1 1 0 0 1 0 1 1 |
| 6 | 0110 | 1 1 1 1 0 1 0 1 0 0 1 1 0 0 1 0 |
| 7 | 1110 | 1 0 1 1 1 1 0 1 0 1 0 0 1 1 0 0 |
| 8 | 0001 | 0 1 1 1 1 0 1 0 0 0 0 0 0 1 1 0 |
| 9 | 1001 | 1 0 0 1 1 1 1 0 1 0 0 0 0 0 0 1 |
| 10 | 0101 | 0 1 1 0 0 1 1 1 1 0 1 0 0 0 0 0 |
| 11 | 1101 | 0 0 0 1 1 0 0 1 1 1 1 0 1 0 0 0 |
| 12 | 0011 | 0 0 0 0 0 1 1 0 0 1 1 1 1 0 1 0 |
| 13 | 1011 | 1 0 0 0 0 0 0 1 1 0 0 1 1 1 1 0 |
| 14 | 0111 | 1 0 1 0 0 0 0 0 0 1 1 0 0 1 1 1 |
| 15 | 1111 | 1 1 1 0 1 0 0 0 0 0 0 1 1 0 0 1 |

Because the 16-chip codes of the 802.15.4b protocol are related by a circular shift, correlation to alternate codes during the eight-code preamble produces alternate signal peaks that occur at 2*n chip intervals (n=0, 1, . . . , 7). The hybrid polyphase and joint time-frequency method includes a two-code detection implementation using n=0 (symbol "0"), and n=4 (symbol "4"). With the hybrid polyphase and joint time-frequency method, the eight-symbol preamble produces a theoretical maximum of fifteen (15) strong peaks. In practice, with the hybrid polyphase and joint time-frequency method, the eight-symbol preamble produces seven (7) strong peaks during the last four (4) symbols of the preamble, because offset and gain correction are being determined and applied during the first four (4) symbols of the preamble.

Figure 5:
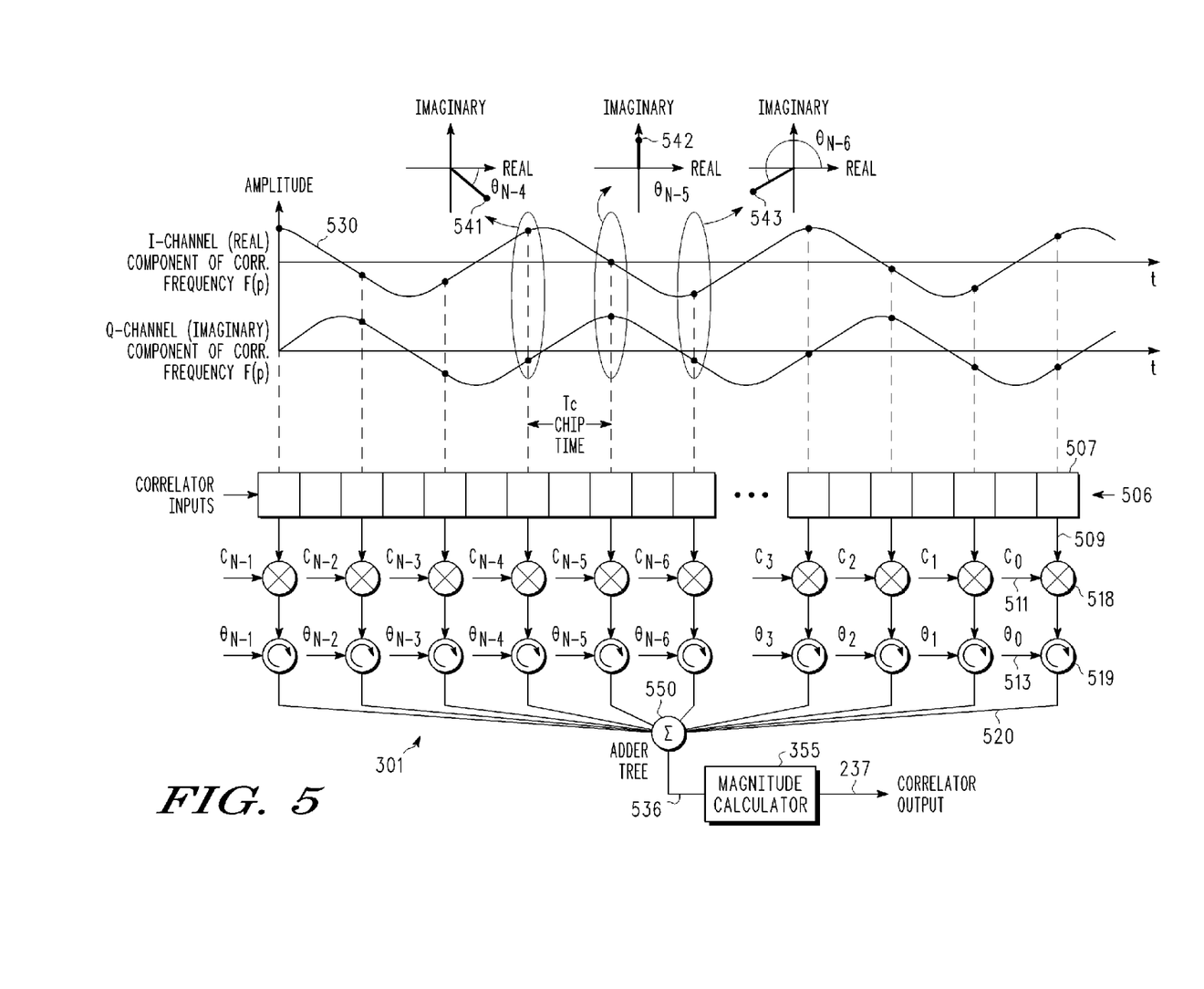
FIG. 5 is a simplified block diagram of the correlator structure of FIG. 3 suitable for use in the demodulator of FIG. 1, and a graphical representation of frequency correction of a received signal versus time.

FIG. 5 is a high-level block diagram of the correlator structure 301, and graphical representations of frequency correction of a received signal versus time. The correlator structure 301 comprises a first-in, first-out buffer, or delay line, 506 having S×N−(S−1) registers 507 and N taps 509, where S is the oversampling ratio. Each tap 509 comprises a quadrant rotation 518 with an associated de-spreading code $C_0$ through $C_{N-1}$ 511, and a CORDIC phase rotation 519 with an associated phase coefficient $\theta_0$ through $\theta_{N-1}$ 513. In the exemplary embodiment, S=2; however, in general, there can be any oversampling ratio. In the exemplary embodiment, the tapped delay line 506 has thirty-one (31) registers 507. In the exemplary embodiment, the tapped delay line 506 operates at 2 MHz, which is equivalent to two samples per chip time. In the exemplary embodiment, the chip time is 16 μsec. In the exemplary embodiment, the tapped delay line 506 has sixteen (16) taps 509, i.e., a tap at every other register, which means that there is one tap 509 for each complex chip of the PN code. The de-spreading tap weights, $C_0$ through $C_{N-1}$, are variable at each tap 509. Frequency correction is defined as a time-varying phase that is inputted to each tap 509 using variables $\theta_0$ through $\theta_{N-1}$ 513. In general, the frequency correction is implemented by a phase rotation comprising a quadrant rotation followed by K stages of CORDIC rotation. An output 520 from each tap 509 is added at adder 550. A complex output 536 from the adder 550 is fed into a magnitude circuit 355 that calculates $(I^2+Q^2)^{1/2}$, which is a magnitude 237 of the complex output from the adder 550. The magnitude 237 is fed into the correlator control module 205.

A received noisy signal is inputted to the tapped delay line 506 at two samples per chip. The I and Q discrete samples are first stored in registers of the tapped delay line 506. The content of each register represents a complex sample I+jQ. The output of the tapped delay line 506 is then manipulated to perform joint de-spreading and frequency correction. This frequency-corrected output is then used to perform M-ary symbol decisions. In the exemplary embodiment, M=16. In the exemplary embodiment, the correlator operates at 48 MHz. In the exemplary embodiment, each tap has three stages. The CORDIC coefficients produce a quadrant phase rotation to 0°, 90°, 180° or 270° in the first stage. The CORDIC coefficients also produce a phase rotation of ±26° and ±14°, in the second and third stages, respectively.

An approach to improving frequency error estimation is found by recognizing that correcting a frequency error is equivalent to performing a time-varying phase correction, which needs to be phase continuous only over the length of the correlator structure 301. Frequency correction is accomplished by applying a time-varying periodic phase shift to a received complex signal, where the frequency index determines a rate of change of the phase shift per sample. This approach is illustrated in FIG. 5, where a single correlator structure 301 is shown with two complex multiplies, one for de-spreading and one for phase rotation. This correlator structure 301 is time-shared to perform de-spreading at different frequency offsets using the same data, the same N de-spreading tap weights, and multiple sets of N phase rotation coefficients.

FIG. 5 illustrates that the complex correction frequency can be represented as a rotating complex vector, or phasor 530. By sampling the phasor 530 at chip times corresponding to the taps, a set of correction phases $\theta_n$ (n=0, 1, ..., 31) are computed. FIG. 5 illustrates that a specific correction frequency is translated into a set of phase coefficients $\theta_n$ by sampling the phasor 330 that has a frequency of F(p), at sample intervals Tc=chip time. FIG. 5 shows three samples 541, 542 and 543 of the phasor 530. The 802.15.4b preamble consists of symbol "0" repeated eight times. During preamble detection, the data coefficients $C_0$ to $C_{N-1}$ are held constant and their values are chosen to represent symbol "0", while K correlations are performed with K sets of phase coefficients $\theta_{k,0}, \theta_{k,1}, \theta_{k,2}, ..., \theta_{k,N-1}$ (i.e., k=0, 1, ..., K-1). In one exemplary embodiment, K=11. The correction frequency that corresponds to the set of coefficients that produces the largest magnitude at the output of the correlator structure 501 forms an estimate of the required frequency correction. Then, during data detection, the phase coefficients are held constant using the $k^{th}$ set (optimum frequency correction), while $2^M$=16 correlations are performed using sixteen (16) sets of PN code coefficients $C_{m,0}, C_{m,1}, C_{m,2}, ..., C_{m,N-1}$ (i.e., m=0, 1, ..., 15) to perform 16-ary code keying demodulation of the 802.15.4b protocol.

The addition of the CORDIC stages to each tap 509 allows the correlator structure 301 to be time-shared to de-spread one signal with multiple frequency offsets, or to de-spread one signal with one frequency offset and multiple codes. The correlator structure 501 provides frequency estimation and enables the correlator 240 to be used for joint frequency correction and de-spreading.

The joint time-frequency detection algorithm and the CORDIC correlator are more fully described in U.S. Pat. No. 7,889,782, issued Feb. 15, 2011 to Gorday, et al., entitled JOINT DE-SPREADING AND FREQUENCY CORRECTION USING A CORRELATOR, which is assigned to the assignee of the present invention, and which is hereby fully incorporated by reference herein.

Figure 6:
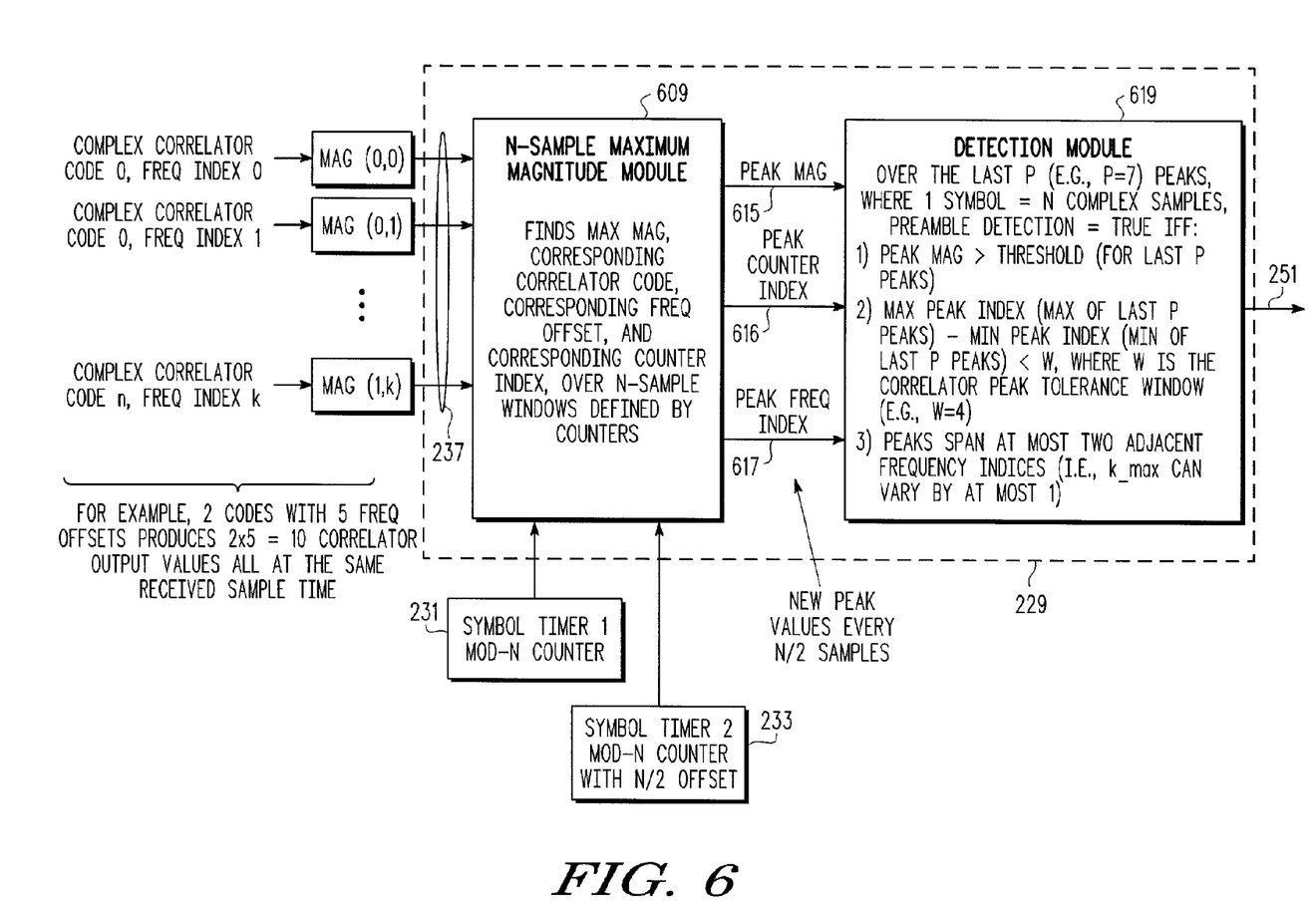
FIG. 6 is a diagram of a detection and synchronization module suitable for use in the demodulator of FIG. 1 in accordance with an embodiment of the present invention.

Referring to FIG. 6, a diagram of the operation of the detection and synchronization module 229 will now be discussed and described. Given one or more complex correlations from one or more correlators 240 for each sample n, e.g., correlations at the output 536, a magnitude 237 for each of these correlations is determined. The magnitudes 237 are coupled to the detection and synchronization module 229 that is configured to find correlation peaks from the plurality of correlations that are separated by a predetermined time period, e.g., approximately a symbol period, and second correlation peaks from the second plurality of correlations that are separated by the predetermined time period. The detection and synchronization module 229 includes a maximum magnitude module 609 that finds a maximum, or peak, magnitude 615, and that finds a corresponding correlator code, peak counter index 616, and frequency offset, or peak frequency index, 617, over N-sample windows defined by the counters 231 and 233. The maximum magnitude module 609 is arranged for selecting a strongest correlation, i.e., peak magnitude, from each sequence of correlations for a corresponding symbol period.

The decision module 250 is configured for selecting a strongest first correlation from the series of first correlations (e.g., symbol "0") for each symbol period and a strongest second correlation from the series of second correlations (e.g., symbol "4") for each symbol period. Where there are N, e.g., N=16, samples per symbol period, the largest magnitude correlation of sixteen correlations for the symbol "0" correlation and sixteen correlations for the symbol "4" correlation are selected as the respective peak magnitude. For each symbol, the peak magnitude value, a counter index from a corresponding counter, i.e., counter_1, 231 and counter_2, 233, and a frequency index 211 are determined. The counter index value establishes the location of the strongest correlation within a particular symbol period or correlation span, and thus, the location where a symbol begins in the received data samples. When a preamble is received, the strongest correlation for the symbol "0" correlation and the strongest correlation for the symbol "4" correlation do not occur at the same time; however, the correlations occur at or very near the same counter index value as determined by the respective counters.

The peak magnitude 615, peak counter index 616 and peak frequency index 617 are coupled to a detection module 619. The detection module 619 is configured for determining whether the data frame is present, based on the strongest first correlation(s) with associated first in the counter index at which peaks occur and the strongest second correlation(s) with associated second in the counter index at which peaks occur for each symbol period. The detection module 619 determines whether, over the last P number of peak magnitudes (e.g., P=7), each of the peak magnitudes was greater than a threshold, and whether each of the peak magnitudes was located within a particular time tolerance window W (e.g., within W=4 samples).

The detection module 619 comprises a comparator for determining whether each or any of the peak magnitudes, e.g., the first correlation peaks and the second correlation peaks, satisfy a threshold. The detection module 619 also comprises a window function for determining whether the first correlation peaks and the second correlation peaks that satisfy a threshold also fall within the window W around the predetermined time period, e.g., symbol period. That is, whether max_peak_index minus min_peak_index is less than W. In an exemplary embodiment, W=4. The detection module 619 determines whether the peaks span, at most, two adjacent frequency indices, i.e., k_max can vary by, at most, one (1). When a preselected number of consecutive peaks that satisfy all these conditions are found, the preamble, and thus data frame, has been detected, and synchronization information and associated counter index is provided by the detect and synchronization results 251. In an exemplary embodiment, the preselected number of consecutive peaks is seven (7).

For a two-code search of symbol "0" and symbol "4", the detection rules can be summarized, as follows. Require P (e.g., P=7) consecutive peaks for preamble detection. Require peaks to alternate max_n (e.g., 0 4 0 4 0 4 0), because symbol "0" and symbol "4" are offset by half a symbol and the maximum correlator output should produce alternating peaks. Require peaks to be at intervals of half a symbol with a tolerance defined by the window W. This enforces a requirement that the pattern of maximum correlator peaks are occurring at the symbol rate, where the alternating symbol "0" and symbol "4" peaks are separated by half a symbol. Require peaks to occur at frequency indexes that are at most ±1 frequency index from a nominal frequency index, i.e., max_k can vary at most by one. This enforces the requirement that the same frequency is being detected. The variance of one allows for the case where the actual frequency is midway between two frequency index values.

Figure 7:
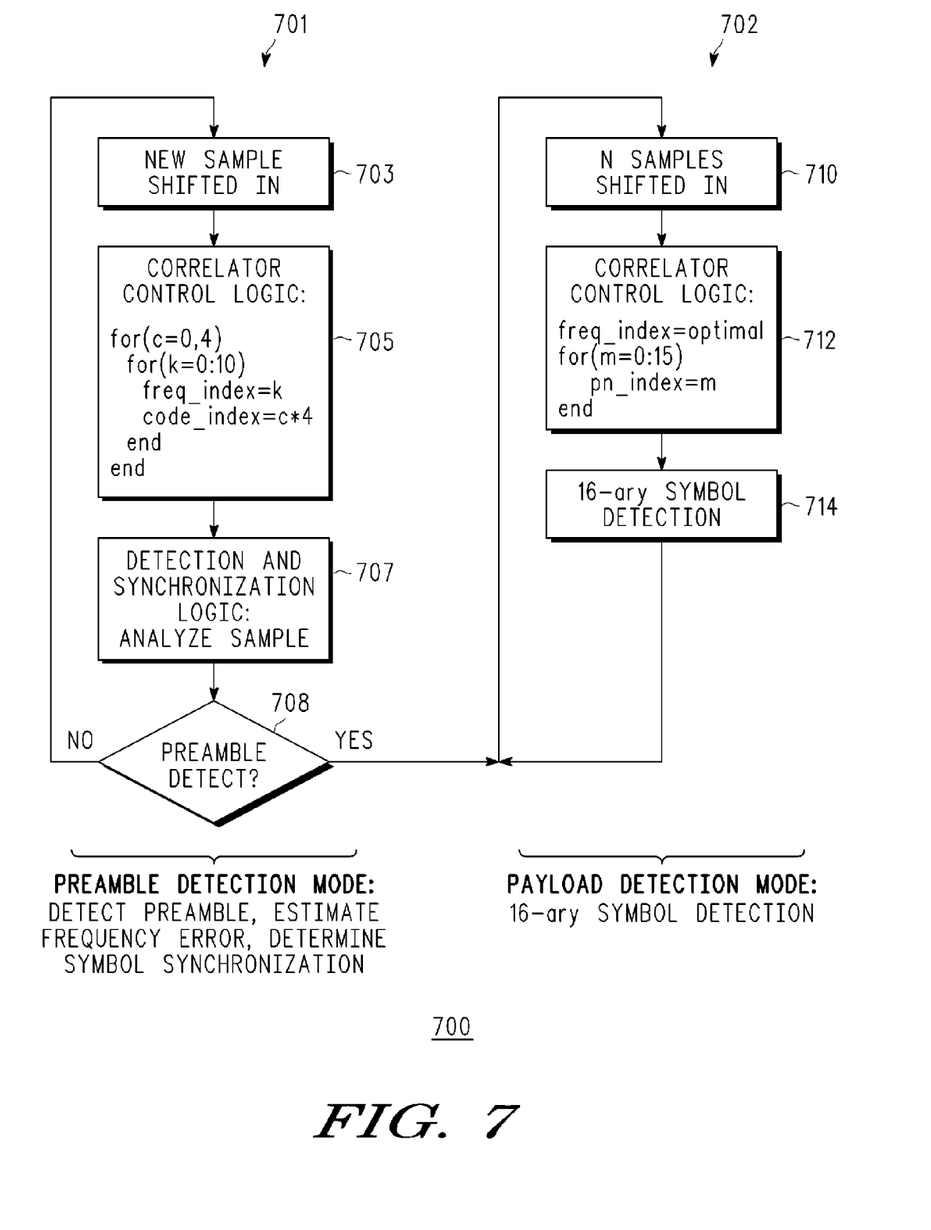
FIG. 7 is a flow diagram of the operation of the demodulator of FIG. 2.

FIG. 7 is a high-level flow diagram 700 of the operation of the demodulator 150. When a preamble data frame is expected, each set of received samples is correlated with one of two de-spreading codes, and is repeated at different frequency offsets to find a best correlation result. Then, each set of received samples is correlated with the other of the two de-spreading codes, and is repeated at different frequency offsets to find a best correlation result. After the preamble is detected and an optimum frequency is estimated, each set of received samples is correlated with all sixteen (16) de-spreading codes, but with only the optimum set of frequency correction coefficients. FIG. 7 shows how the code index 213 and the frequency index 211 are varied independently during the preamble detection mode 701 and the payload detection mode 702. The flow starts in the preamble detection mode 701. At step 703, a new sample is shifted into the tapped delay line 506 by the correlator control module 205. In the exemplary embodiment, the code index 213 is varied between c=0 (for de-spreading symbol "0") and c=4 (for de-spreading symbol "4"), and the frequency index 211 is varied from k=0 to k=10, by the correlator control module 205 to determine the optimal sample and the optimal frequency to which to synchronize the correlator 240. At step 705, for each setting c of the code_index, the freq_index is varied between k=0 and k=10, and, for each set of settings of c and k, a correlation is performed on the current sample by the correlator 240. At step 707, the sample is analyzed by the detection and synchronization module 229. If the preamble is detected, step 708, the flow goes to the payload detection mode 702. If the preamble is not detected, the flow returns to step 703. At step 710, N samples are shifted into the tapped delay line 506. In the exemplary embodiment, at step 712, the frequency index 211 and the code index 213 are held constant at the optimal value, while the code index 213 is varied from m=0 to m=15, to determine which of the sixteen (16) symbols, of the 802.15.4b protocol is being received. The received symbol determination is then mapped by the decision module 250 to a set of M received information bits, step 714.

In general, for M-ary symbol detection, during preamble detection, the PN index is fixed at "0" and the frequency index 211 is varied from k=0 to k=K−1, where K is the total number of frequency corrections, to determine the optimum value to compensate for the frequency error. Then, during payload detection, the code index 213 and the frequency index 211 is held constant at the optimum value, while the code index 213 is varied from m=0 to m=M−1, where M is the total number of PN codes, to determine which of the M symbols of the protocol is being received.

In the exemplary embodiment, during the preamble portion of the received packet, the correlator 240 is configured to de-spread only symbol "0", but at eleven (11) different frequency offsets. The detection module 619 searches for peaks in the output of the correlator 240 that are separated at time intervals equal to the length of a symbol and that are all occurring at a same frequency offset. The frequency error estimate is calculated from the frequency correction corresponding to a strongest correlator peak. Then, during data detection, only one set of phase correction coefficients is used (corresponding to the frequency correction selected during preamble detection), and the correlator 240 is configured to de-spread a set of received samples using all sixteen (16) possible de-spreading codes.

During the preamble detection mode 701, the correlator control module 205 performs N×K correlations per received sample (e.g., N=2 codes, K=11 frequencies). During the preamble detection mode 701, the detection and synchronization module 229 processes the correlator results (i.e., max_mag, max_k and max_n) to determine if the preamble has been received.

Figure 8:
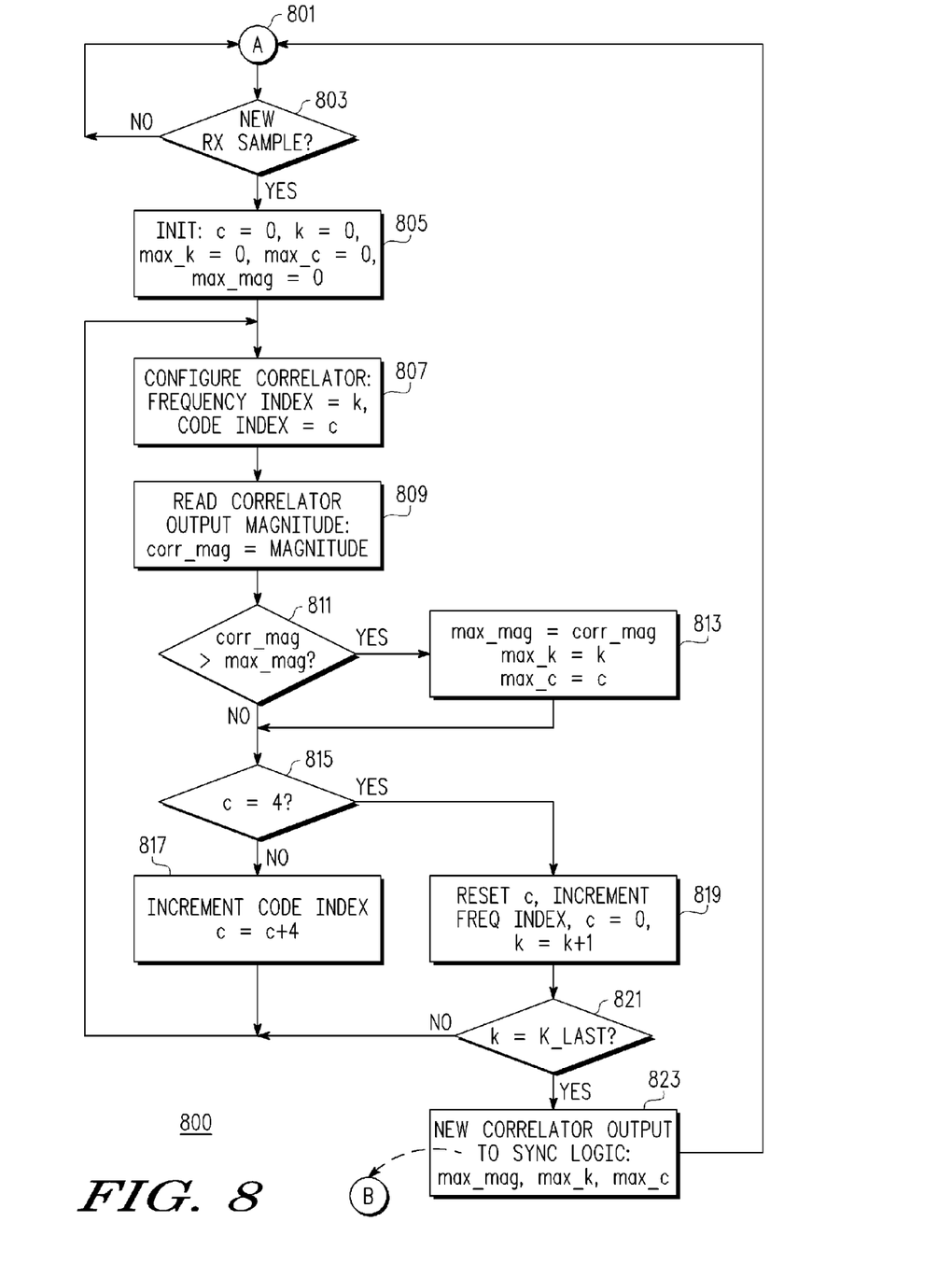
FIGS. 8-10 are flow diagrams showing detection and synchronization methods suitable for use in the demodulator of FIG. 1 in accordance with an embodiment of the present invention.

FIG. 8 is a high-level flow diagram showing a detection and synchronization method suitable for use in the demodulator 150. The method 800 starts, and waits, step 801, for a new data sample, and thus new correlation, from each of the first and second correlator. At step 803, once a new data sample (thus correlations) is available, the following initial values are set at step 805: c=0, k=0, max_k=0, max_c=0 and max_mag=0. At step 807, the correlator 240 is configured as follows: the frequency index 211 is set to k, and the code index 213 is set to c. At step 809, the method reads the magnitude 237 (corr_mag) of the output of the correlator 240. If, at step 811, the corr_mag is greater than max_mag, the method proceeds to step 813. At step 813, the max_mag is set equal to the present value of the corr_mag, max_k is set to k, and max_c is set to c. On the other hand, if, at step 811, the corr mag is not greater than max_mag, the method proceeds to step 815. If, at step 815, the value of c is equal to four (4), the method proceeds to step 819. At step 819, the value of c is reset to zero, and the value of k is incremented by one (1). On the other hand, if, at step 815, the value of c is not equal to four (4), the method proceeds to step 817. At step 817, the code index c is incremented. In the exemplary embodiment, c is incremented by four (4). After step 817, the method returns to step 807. After step 819, the method proceeds to step 821. At step 821, if the value of k is not equal to k_last, the method returns to step 807. If, at step 821, the value of k is equal to k_last, the method proceeds to step 823. Separately, the flow goes from step 823 in FIG. 8 to step 907 in FIG. 9. At step 823, correlator results 241 are outputted to the detection and synchronization module 229. The correlator results 241 comprise the present values of max_mag, or magnitude, 237; max_k, or frequency index, 211; and max_c, code index 213. Note that stepping from c=0 to c=4 is specific to the 802.15.4b protocol, and these indices may vary for different embodiments of the invention. Note also that k_last is a design parameter that may change for different embodiments of the invention. For example, in the exemplary embodiment, k_last=10; in another embodiment, k_last=4.

Figure 9:
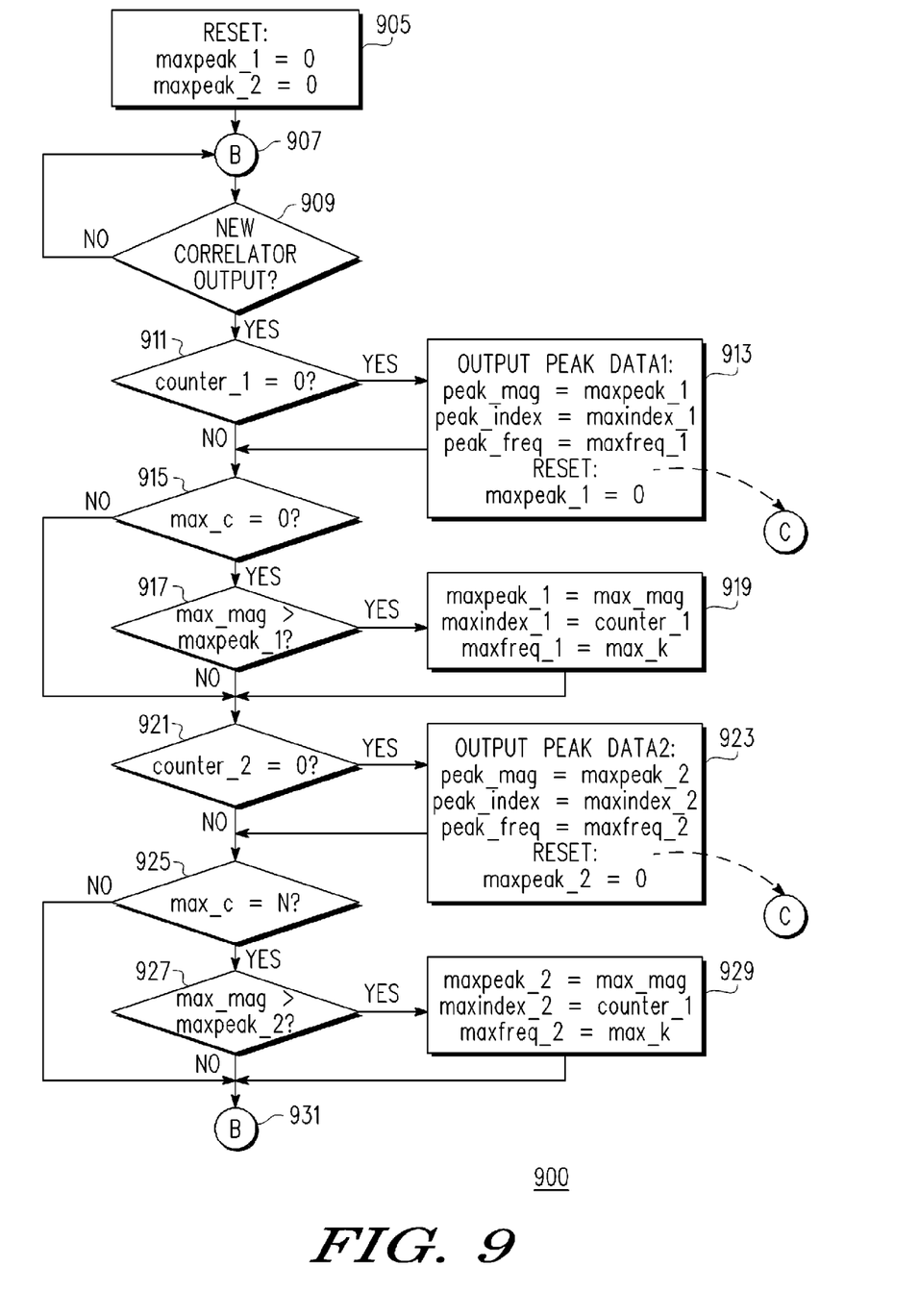
Figure 10:
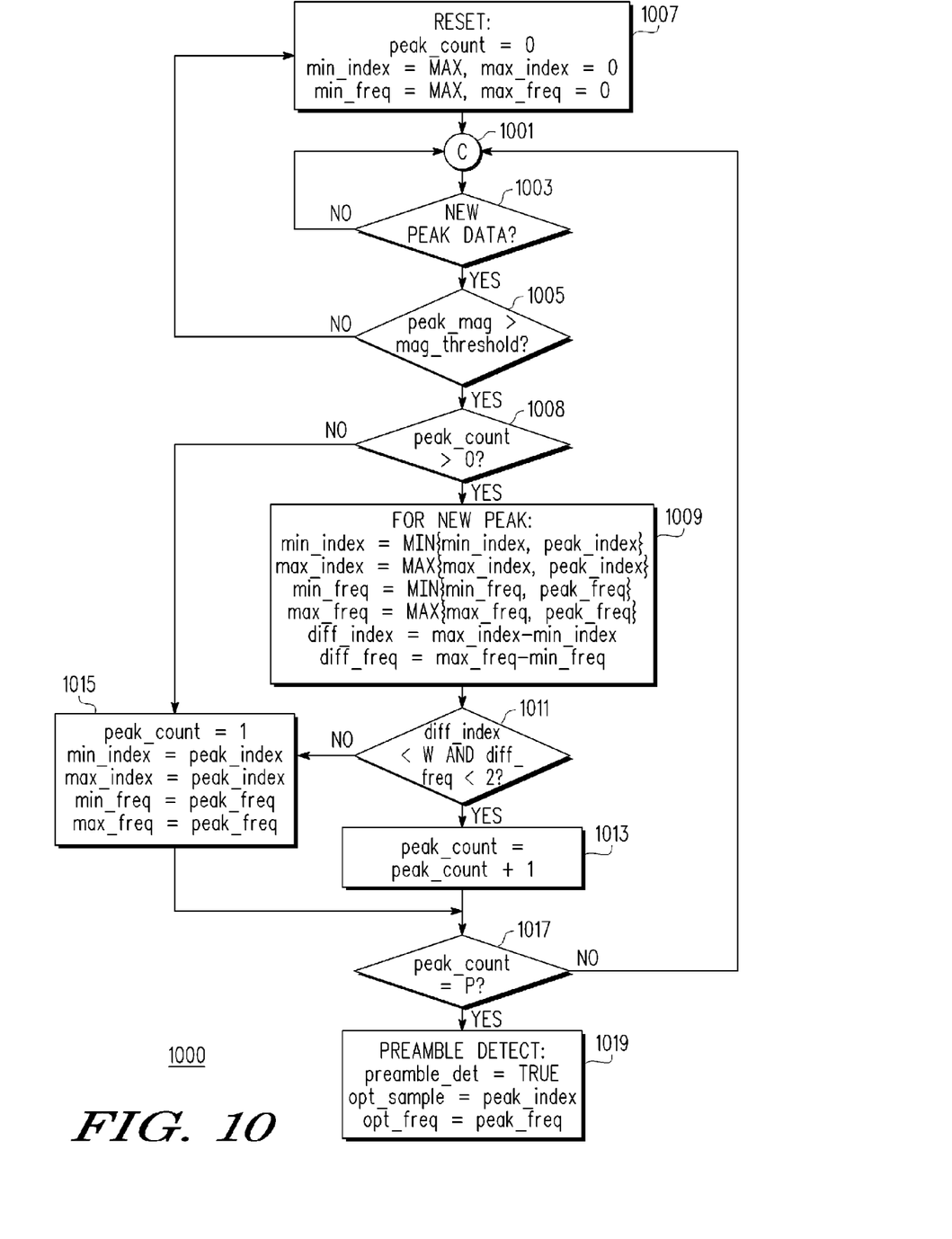

FIG. 9 and FIG. 10 are flow charts showing a more detailed exemplary embodiment of detection and synchronization methods suitable for use in the demodulator 150. The more detailed embodiments shown in FIG. 9 and FIG. 10 are exemplary approaches for implementing the processes described with reference to FIG. 6.

Referring now to FIG. 9, the method 900 selects the strongest correlation from a first and second sequence of correlations for each symbol period. The method 900 assumes at 905 initial conditions of maxpeak_1=0 and maxpeak_2=0. The method 900 then starts, and waits, step 907, for a new data sample, and thus new correlation, from each of the first and second correlator. At step 909, once a new data sample (and thus correlations) is available, counter_1, 131, is checked at step 911 to see if it is equal to zero. If so, at step 913, peak data is outputted and various registers are reset. Specifically, the peak mag (or peak magnitude 615 in FIG. 6) that is equal to maxpeak_1 is reported, the peak_index (or peak counter index 616 in FIG. 6) that is equal to maxindex_1 is reported, and the peak_freq (or peak frequency index 617 in FIG. 6) that is equal to maxfreq_1 is reported, and maxpeak_1 is reset to zero. Separately, the flow goes from step 913 in FIG. 9 to step C in FIG. 10. If at step 911, counter_1 is determined to not equal zero, or after step 913, the method proceeds to step 915 where max_n is checked to see if equals zero. If so, max_mag is compared at step 917 to the present value of maxpeak_1, and, if it is greater, step 919 sets maxpeak_1 to max_mag, maxindex_1 to the present value of counter_1, and maxfreq_1 to max_k. After step 919, or, if the response at step 917 or step 915 is negative, the method proceeds to step 921 where counter_2 is checked to determine if it is equal to zero. If so, at step 923, peak data2 is outputted and various registers are reset. Specifically, the peak_mag 615 is reported to be equal to maxpeak_2, and the peak_index 616 is reported to be equal to maxindex_2, and the peak_freq 617 is reported to be equal to maxfreq_2, and maxpeak_2 is reset to zero. Separately, the flow goes from step 923 in FIG. 9 to step 1001 in FIG. 10. If, at step 921, counter_2 is found not to be equal to zero, or after step 923, the max_n is checked at step 925 to see if it equals N. If so, at step 927, max_mag is compared to the present value of maxpeak_2, and, if it is greater, the method proceeds to step 929 where maxpeak_2 is set equal to max_mag, and maxindex_2 is set equal to the present value of counter_1, and maxfreq_2 is set equal to max_k. The method ends at step 931 after step 925, step 927 or step 929, but the method returns to step 907 for each new data sample. Counter_1, 231, and counter_2, 233, are each incremented by one count each time the method 900 is performed. This can occur when a new data sample is available at 907 or just before the method ends.

Referring to FIG. 10, a more detailed flow chart of one embodiment of a method 1000 of the detection module 619 will now be discussed and described. The method 1000 begins at step 1001, with an input from step 913 or step 923 (see FIG. 9), and the method waits at step 1003 for a new peak_mag and associated peak_index until they become available. When the peak information becomes available, the peak_mag is compared to a mag threshold at step 1005. If a value of the peak magnitude does not satisfy the value of the mag_threshold, then min_index and min_freq are reset to max, max_index and max_freq are reset to zero, and peak_count is reset to zero at step 1007, and the method returns to step 1001. If, at step 1005, the peak magnitude is large enough, and, at step 1008, the peak_count is greater than zero, then, the method proceeds to step 1009. At step 1009, min_index is set equal to the smaller of the current value for min_index and the peak_index, max_index is set equal to the larger of the current value for max_index and peak_index, min_freq is set equal to the smaller of the current value for min_freq and peak_freq, max_freq is set equal to the larger of the current value for max_freq and peak_freq, diff_index is set equal to max_index minus min_index, and diff_freq is set equal to max_freq minus min_freq. Then, at step 1011, the diff_index is compared to a value of the window W (e.g., W=4), and the diff_freq is compared to two (2). If the peak is properly located (step 1011 results in "yes"), a peak count is incremented by one at step 1013. If the peak is not properly located (1011 is negative), or if, at step 1008, the peak_count is not greater than zero, the method proceeds to step 1015. At step 1015, the peak_count is set to one (1), the max_index and the min_index are set to the peak_index, and the min_freq and the max_freq are set to the peak_freq. After step 1015 or step 1013, the peak_count is compared to P (a count threshold) at step 1017, and, if the peak_count is less than P, the method returns to step 1001. If the peak_count equals P, the method proceeds to step 1019. Step 1019 outputs peak data (i.e., synchronization information). More specifically, at step 1019, the decision module 250 outputs that the preamble or data frame has been detected (i.e., preamble_det is true). Furthermore, at step 1019, the decision module 250 outputs its determination that the optimal sample and the optimal frequency to which to synchronize the correlator 240 is the sample and frequency corresponding to the current peak_index and the current peak_index, respectively.

It has been empirically determined that, for the demodulator 150, $\Delta f=36$ ppm with K=5 is needed to adequately span a ±80 ppm maximum frequency error of a link permitted by the 802.15.4b protocol at 915 MHz. Using $\Delta f=36$ ppm with K>5, e.g., K=11, does improve false detection rejections, but does not improve signal detection or frequency estimation.

In the demodulator 150, which is designed for the 802.15.4b protocol with a 900 MHz PHY and 16-chip spreading codes, the hybrid polyphase and joint time-frequency detection method achieves an average false detection interval of approximately one hundred (100) seconds in a continuous search mode, using P=7, W=4, K=5 and two codes, which is an improvement over known products (assuming the preamble and SFD detection algorithms of the known products were used with 16-chip spreading codes). The preceding performance figures are from simulations.

Adjusting the detection parameters (e.g., the peaks detected, P, and the window, W) allows optimization of the demodulator 150 by trading off multipath performance versus false detection performance.

The demodulator 150 combines the polyphase detection algorithm and the joint time-frequency detection algorithm for preamble detection. The hybrid polyphase and joint time-frequency detection method provides additional un-correlated data to reject noise patterns that resemble the preamble. In the hybrid detection method in accordance with an embodiment of the invention, for each of the K frequency offset correlations; two (2) codes, or phases, are correlated to provide additional signal correlation peaks. When using the hybrid detection method with two codes, about twice as many un-correlated noise samples would have to randomly occur, compared to using the joint time-frequency detection method alone, to match the preamble signal correlator peaks. In alternative embodiments, the hybrid polyphase and joint time-frequency detection method performs preamble detection via correlation with more than two codes.

The decision module 250 and the methods described hereinabove can be implemented in a processor (not shown), coupled to the demodulator 150, in which the processor executes appropriate software instructions, or can be implemented in hardware, or can be implemented various combinations of each.

It should be understood that all circuitry described herein may be implemented either in silicon or another semiconductor material or alternatively by software code representation of silicon or another semiconductor material.

Although the invention is described herein with reference to specific embodiments, various modifications and changes can be made without departing from the scope of the present invention as set forth in the claims below. Although the exemplary embodiment of the receiver 100 operates in the 900 MHz band, the invention is applicable with a receiver that operates at other frequency bands. Although the exemplary embodiment of the correlator 240 de-spreads a DSSS signal, the invention is applicable to other types of spread-spectrum signals. Although the exemplary embodiment is for use in a system that uses the 802.15.4b protocol, the invention could also be used in a system that uses the 802.15.4 protocol or in a system that uses any one of various protocols.

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A demodulator for de-spreading a digitally-modulated signal including a plurality of symbols, each symbol having a symbol period and spread among a plurality of chips, the digitally-modulated signal including a preamble of pre-determined symbols, the demodulator comprising:
    a correlator for performing correlations, the correlator including:
        a tapped delay line including a plurality of registers, each register for holding a chip of a symbol of the digitally-modulated signal as a function of time,
        taps operatively coupled to registers for performing a tap weight operation on each chip to rotate a phase of each chip to correct a frequency offset from a nominal carrier frequency, and
        a magnitude calculator for calculating a magnitude of each correlation;
    a first counter;
    a second counter;
    a correlator control module for changing the taps to a different set of tap weight values a plurality of times during each symbol period, and, for each set of tap weight values, causing the correlator to correlate the digitally-modulated signal to a first symbol and to a second symbol, thereby performing a sequence of correlations during each symbol period; and
    a detection and synchronization module, coupled to the first counter and the second counter, for determining a location, within a first symbol period, of correlations to the first pre-determined symbol and for determining a location, within a second symbol period, of correlations to the second pre-determined symbol, the detection and synchronization module including:
        a maximum magnitude module, coupled to the correlator, for selecting a peak magnitude from each sequence of correlations for a corresponding symbol period, and
        a detection module for determining presence of a preamble in the digitally-modulated signal based upon peak magnitudes, location within a symbol period of each peak magnitude, and the set of tap weight values in use at each peak magnitude.

2. The demodulator of claim 1, in which the first pre-determined symbol comprises a first pseudorandom code and the second pre-determined symbol comprises a second pseudorandom code, the first pseudorandom code and the second pseudorandom code each having a same length, and in which the second pre-determined symbol is the first pre-determined pseudorandom code circularly shifted by half the length of the pseudorandom code.

3. The demodulator of claim 1, in which the detection module determines the presence of the preamble only if the peak magnitudes have a value greater than a threshold.

4. The demodulator of claim 1, in which the detection module determines the presence of the preamble only if the peak magnitudes occur during each of a predetermined number of consecutive symbol periods.

5. The demodulator of claim 1, in which the detection module determines the presence of the preamble only if locations within a symbol period of each peak magnitude is within a predetermined time window.

6. The demodulator of claim 1, in which the a first counter is a first modulo-N counter and the second counter is a second modulo-N counter, and in which a count of the second modulo-N counter is offset from the count of the first modulo-N counter by N/2 counts.

7. The demodulator of claim 6, in which the digitally-modulated signal is a direct sequence spread spectrum (DSSS) signal having a packet structure in conformance with an 802.15.4b protocol.

8. The demodulator of claim 1, in which the taps implement a coordinate rotation digital computer (CORDIC) operation.

9. A demodulator for de-spreading a direct sequence spread spectrum (DSSS) signal, the DSSS signal including symbols, the DSSS signal having a nominal carrier frequency, the demodulator comprising:
    a correlator having a plurality of taps, each tap having a tap weight;
    a first symbol timer used by the correlator to perform correlations to a first pre-determined pseudorandom code, and for generating a first counter index;
    a second symbol timer used by the correlator to perform correlations to a second pre-determined pseudorandom code, a symbol period of the second symbol timer being offset from a symbol period of the first symbol timer by half a symbol period, and for generating a second counter index;
    a frequency correction generator for outputting a plurality of sets of phase rotation tap weights, each set of phase rotation tap weights corresponding to a pre-determined offset of an actual carrier frequency of the DSSS signal from the nominal carrier frequency, and for outputting a frequency index;
    a pseudorandom code generator for outputting a plurality of sets of de-spreading tap weights, each set of de-spreading tap weights corresponding to pre-determined pseudorandom codes, for de-spreading the DSSS signal; and
    a decision module for selectively controlling application of the sets of de-spreading tap weights and the phase rotation tap weights to the taps, the application based upon results of the correlations to the first and second pre-determined pseudorandom codes, each correlation performed using each of the plurality of sets of phase rotation tap weights.

10. The demodulator of claim 9, including a magnitude calculator for calculating a magnitude of the de-spreaded DSSS signal, and in which the results include the magnitude of each correlation, the counter indexes corresponding to each correlation and the frequency index corresponding to each correlation.

11. The demodulator of claim 9, in which the tap weights outputted by the pseudorandom code generator include coordinate rotation digital computer (CORDIC) coefficients.

12. The demodulator of claim 11, in which the taps change the phase of the DSSS signal, to compensate for the predetermined offset of the actual carrier frequency of the DSSS signal from the nominal carrier frequency.

13. The demodulator of claim 9, in which the correlator correlates, using one set of the plurality of sets of de-spreading tap weights and sequentially each set of the plurality of sets of phase rotation tap weights, a symbol of the DSSS signal.

14. The demodulator of claim 9, in which the correlator correlates, using one set of the plurality of sets of phase rotation tap weights and sequentially each set of the plurality of sets of de-spreading tap weights, a symbol of the DSSS signal.

15. The demodulator of claim 9, in which the DSSS signal is a signal having a packet structure in conformance with an 802.15.4b protocol.

16. The demodulator of claim 15, in which the DSSS signal has a clock rate and the correlator operates at a higher clock rate than the clock rate of the DSSS signal.

17. The demodulator of claim 9, in which the frequency correction generator calculates phase correction coefficients to correct for unknown frequency offsets.

18. A method of detecting presence of a data frame in data samples of a received signal having a nominal carrier frequency, the method comprising:

correlating, over consecutive symbol periods, data samples with a plurality of sets of first coefficients corresponding to a known first symbol to provide a first series of correlations, each set of the plurality of sets of first coefficients compensating for a different frequency offset from the nominal carrier frequency, each correlation of the first series of correlations having a frequency index in which a value of the frequency index corresponds to a different frequency offset, and having a counter index in which a value of the counter index corresponds to a location of a correlation within a particular first symbol period;

correlating, over consecutive symbol periods, the data samples with a plurality of sets of second coefficients corresponding to a known second symbol to provide a second series of correlations, each set of the plurality of sets of second coefficients compensating for a different frequency offset from the nominal carrier frequency, the second coefficients including a portion of the first coefficients, each correlation of the second series of correlations having a frequency index in which a value of the frequency index corresponds to a different frequency offset, and having a counter index in which a value of the counter index corresponds to a location of a correlation within a particular second symbol period;

calculating a magnitude of each correlation;

associating a frequency index value and a counter index value with the magnitude of each correlation;

selecting, for each first symbol period, a largest magnitude from the first series of correlations and its associated frequency index and counter index;

selecting, for each second symbol period, a largest magnitude from the second series of correlations and its associated frequency index and counter index; and determining whether the data frame is present, based on values of the frequency indexes and counter indexes associated with the selected largest magnitudes from the first series of correlations, and based on values of the frequency indexes and counter indexes associated with the selected largest magnitudes from the second series of correlations.

19. The method of claim 18, wherein the data frame is a preamble.

20. The method of claim 18, wherein the signal is a direct sequence spread spectrum (DSSS) signal having a packet structure in conformance with an 802.15.4b protocol.

* * * * *

UNITED STATES PATENT AND TRADEMARK OFFICE
CERTIFICATE OF CORRECTION

| | | |
|---|---|---|
| PATENT NO. | : 7,991,043 B2 | |
| APPLICATION NO. | : 12/140597 | |
| DATED | : August 2, 2011 | |
| INVENTOR(S) | : Robert Mark Gorday | |

It is certified that error appears in the above-identified patent and that said Letters Patent is hereby corrected as shown below:

Col. 15, in claim 1, line 60:

change "peak magnitudes, location" to --locations--.

Signed and Sealed this
Twenty-fifth Day of October, 2011

David J. Kappos
*Director of the United States Patent and Trademark Office*